United States Patent
Bragg

(10) Patent No.: US 9,819,579 B2
(45) Date of Patent: Nov. 14, 2017

(54) HEADER SPACE ANALYSIS EXTENSION SYSTEMS AND METHODS FOR TRANSPORT NETWORKS

(71) Applicant: Nigel Lawrence Bragg, Cambridge (GB)

(72) Inventor: Nigel Lawrence Bragg, Cambridge (GB)

(73) Assignee: Ciena Corporation, Hanover, MD (US)

( * ) Notice: Subject to any disclaimer, the term of this patent is extended or adjusted under 35 U.S.C. 154(b) by 180 days.

(21) Appl. No.: 14/492,524

(22) Filed: Sep. 22, 2014

(65) Prior Publication Data

US 2016/0087882 A1 Mar. 24, 2016

(51) Int. Cl.

| | |
|---|---|
| *H04L 12/723* | (2013.01) |
| *H04L 12/741* | (2013.01) |
| *H04L 12/24* | (2006.01) |
| *H04L 12/26* | (2006.01) |

(52) U.S. Cl.
CPC .............. *H04L 45/50* (2013.01); *H04L 45/74* (2013.01); *H04L 41/12* (2013.01); *H04L 43/10* (2013.01)

(58) Field of Classification Search
CPC ......... H04L 45/50; H04L 45/74; H04L 41/12; H04L 43/10; H04W 8/26
See application file for complete search history.

(56) References Cited

U.S. PATENT DOCUMENTS

| | | | | |
|---|---|---|---|---|
| 5,274,641 A | * | 12/1993 | Shobatake | .......... H04L 12/5602 370/392 |
| 6,650,640 B1 | * | 11/2003 | Muller | .................... H04L 49/90 370/392 |
| 7,983,174 B1 | * | 7/2011 | Monaghan | .......... H04L 43/0817 370/242 |
| 8,271,618 B1 | * | 9/2012 | Kridlo | ..................... H04L 67/06 709/219 |
| 2003/0176212 A1 | * | 9/2003 | Schlottmann | ......... A63F 13/005 463/20 |

(Continued)

OTHER PUBLICATIONS

Kazemian et al., "Header Space Analysis: Static Checking for Networks," NSDI, Apr. 25, 2012, slides 1-28.

(Continued)

*Primary Examiner* — Walter Divito
(74) *Attorney, Agent, or Firm* — Clements Bernard Walker PLLC; Christopher L. Bernard; Lawrence A. Baratta, Jr.

(57) ABSTRACT

A method for validation of a packet transport network includes performing a header space analysis, with input headers to obtain output headers from the header space analysis, between one or more ingress points and a particular egress point; determining disjointness of the output headers; and determining validity of a point-to-point connection property of the packet transport network based on the disjointness of the output headers. The header space analysis allows near-real-time validation that packet transport flows in an Multiprotocol Label Switching-Transport Profile (MPLS-TP) network have been correctly programmed on the switches by a Software Defined Networking (SDN) controller or other technique such that the correct label mappings have been made to carry a flow from a source to a destination, and all flows from any source to a destination are isolated from one another.

20 Claims, 4 Drawing Sheets

(56) References Cited

U.S. PATENT DOCUMENTS

| | | | |
|---|---|---|---|
| 2004/0095934 A1* | 5/2004 | Cheng | H04L 45/16 370/390 |
| 2005/0010863 A1* | 1/2005 | Zernik | G06F 17/2211 715/229 |
| 2010/0180062 A1* | 7/2010 | Hidaka | G06F 13/4022 710/314 |
| 2013/0019008 A1* | 1/2013 | Jorgenson | H04L 41/12 709/224 |

OTHER PUBLICATIONS

Kazemian et al., "Header Space Analysis: Static Checking for Networks," Tech Report, pp. 1-16.
Kazemian et al., "Header Space Analysis Part I," Summer School on Formal Methods and Networks Cornell University, Jun. 2013, slides 1-86.

* cited by examiner

HEADER SPACE ANALYSIS EXTENSION SYSTEMS AND METHODS FOR TRANSPORT NETWORKS

FIELD OF THE DISCLOSURE

The present disclosure relates generally to networking systems and methods. More particularly, the present disclosure relates to header space analysis systems and methods for transport networks.

BACKGROUND OF THE DISCLOSURE

When Multiprotocol Label Switching (MPLS) is implemented in transport networks (such as MPLS-Transport Profile (MPLS-TP)), it is essential that transport network properties are preserved in the packet domain. Specifically, the uniqueness and integrity of an individual point-to-point connection must be maintained from end-to-end, to allow monitoring integrity and performance with dedicated data path Operations, Administration, and Maintenance (OAM), uncontaminated by information from any other path. This end-to-end path integrity is not maintained by native MPLS; typically paths from different sources to a common destination are merged, to enhance scalability. There is no intrinsic mechanism in MPLS-TP to prevent such merging of paths, it is merely a convention of the MPLS-TP control entity that separation of paths is preserved.

Also, there is an evolving technique known as Header Space Analysis (HSA), which uses an algebra of packet headers propagated through a network model, to probe destinations reachable from sources in a general way, rather than relying on specific use-cases to sample reachability. As a consequence, it offers an analytic technique to prove the validity of its results. A key aspect of the HSA technique is its computability; because a whole volume of header space can be encoded in one header value, it allows exhaustive testing of networks of significant scale, which would be out of reach of investigations by brute-force application of binary-coded headers. Currently published applications of HSA are reachability analysis, loop detection, and Virtual Private Network (VPN) ("slice") isolation.

The transport application introduced above has not been disclosed in the HSA. Although "VPN isolation" has a related objective, the separators in that application use a simple domain-wide Virtual Local Area Network (VLAN) or other VPN Identifier (e.g. as defined in RFC 4364) to achieve isolation, not a coordinated hop-by-hop selection from a single flat label space, as in the transport application.

BRIEF SUMMARY OF THE DISCLOSURE

In an exemplary embodiment, a method for validation of a packet transport network includes performing a header space analysis, with input headers to obtain output headers from the header space analysis, between one or more ingress points and a particular egress point; determining disjointness of the output headers; and determining validity of a point-to-point connection property of the packet transport network based on the disjointness of the output headers. The header space analysis can include setting up a header for each of the one or more ingress points intended to reach the particular egress point; and simulating propagation of the header for each of the one or more ingress points to the particular egress point to obtain the output headers. The determining disjointness can include consolidating header pairs differing in only a single bit into a single less-specific header prior to another stage of a pairwise comparisons.

The header space analysis can include setting up wildcard headers from one or more ingress points; and simulating propagation of the wildcard headers to the particular egress point. The determining disjointness can include performing pairwise comparisons of all the output headers. The determining disjointness can include consolidating header pairs differing in only a single bit into a single less-specific header prior to another stage of pairwise comparisons of all the output headers. The header space analysis can include setting up a header at the particular egress point corresponding to a specific ingress point; simulating, in the header space analysis, propagation of the header in reverse to each of the associated ingress points; and testing that a transformed header is present at the specific ingress point and is not present at any other ingress point. The packet transport network can utilize Multiprotocol Label Switching-Transport Profile (MPLS-TP). The method can be performed in a tool associated with a management system of the packet transport network.

In another exemplary embodiment, a server configured for validation of a packet transport network includes a processor; and memory storing instructions that, when executed, cause the processor to perform a header space analysis, with input headers to obtain output headers from the header space analysis, between one or more ingress points and a particular egress point, determine disjointness of the output headers, and determine validity of a point-to-point connection property of the packet transport network based on the disjointness of the output headers. For the header space analysis, the memory storing the instructions that, when executed, can further cause the processor to: set up a header for each of the one or more ingress points intended to reach the particular egress point; and simulate propagation of the header for each of the one or more ingress points to the particular egress point to obtain the output headers. To determine disjointness, the memory storing the instructions that, when executed, can further cause the processor to: consolidate header pairs differing in only a single bit into a single less-specific header prior to another stage of a pairwise comparisons.

For the header space analysis, the memory storing the instructions that, when executed, can further cause the processor to: set up wildcard headers from one or more ingress points; and simulate propagation of the wildcard headers to the particular egress point. To determine disjointness, the memory storing the instructions that, when executed, can further cause the processor to: perform pairwise comparisons of all the output headers. To determine disjointness, the memory storing the instructions that, when executed, can further cause the processor to: consolidate header pairs differing in only a single bit into a single less-specific header prior to another stage of pairwise comparisons of all the output headers. For the header space analysis, the memory storing the instructions that, when executed, can further cause the processor to: set up a header at the particular egress point corresponding to a specific ingress point; simulate, in the header space analysis, propagation of the header in reverse to each of the associated ingress points; and test that a transformed header is present at the specific ingress point and is not present at any other ingress point. The packet transport network can utilize Multiprotocol Label Switching-Transport Profile (MPLS-TP). The server can be associated with a management system of the packet transport network.

In a further exemplary embodiment, a packet transport network includes a plurality of interconnected network elements performing packet forwarding using a transport paradigm which uniquely identify an A-Z path of every packet in the network without merging headers at intermediate network elements; and a server configured to perform a header space analysis, with input headers to obtain output headers from the header space analysis, between one or more ingress points and a particular egress point, each of the ingress points and the particular egress point being a different network element of the plurality of interconnected network elements, determine disjointness of the output headers, and determine validity of a point-to-point connection property of the packet transport network based on the disjointness of the output headers. The packet transport network can utilize Multiprotocol Label Switching-Transport Profile (MPLS-TP).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, header space analysis systems and methods are described for transport networks, such as MPLS-TP. This disclosure identifies a technique that may be used to verify independently that path integrity is maintained, using the actual forwarding parameters being used by the production network. The header space analysis systems and methods allow near-real-time validation that packet transport flows in an MPLS-TP network have been correctly programmed on the switches by an SDN controller or other technique such that the correct label mappings have been made to carry a flow from a source to a destination, and all flows from any source to a destination are isolated from one another.

MPLS Network

Figure 1:
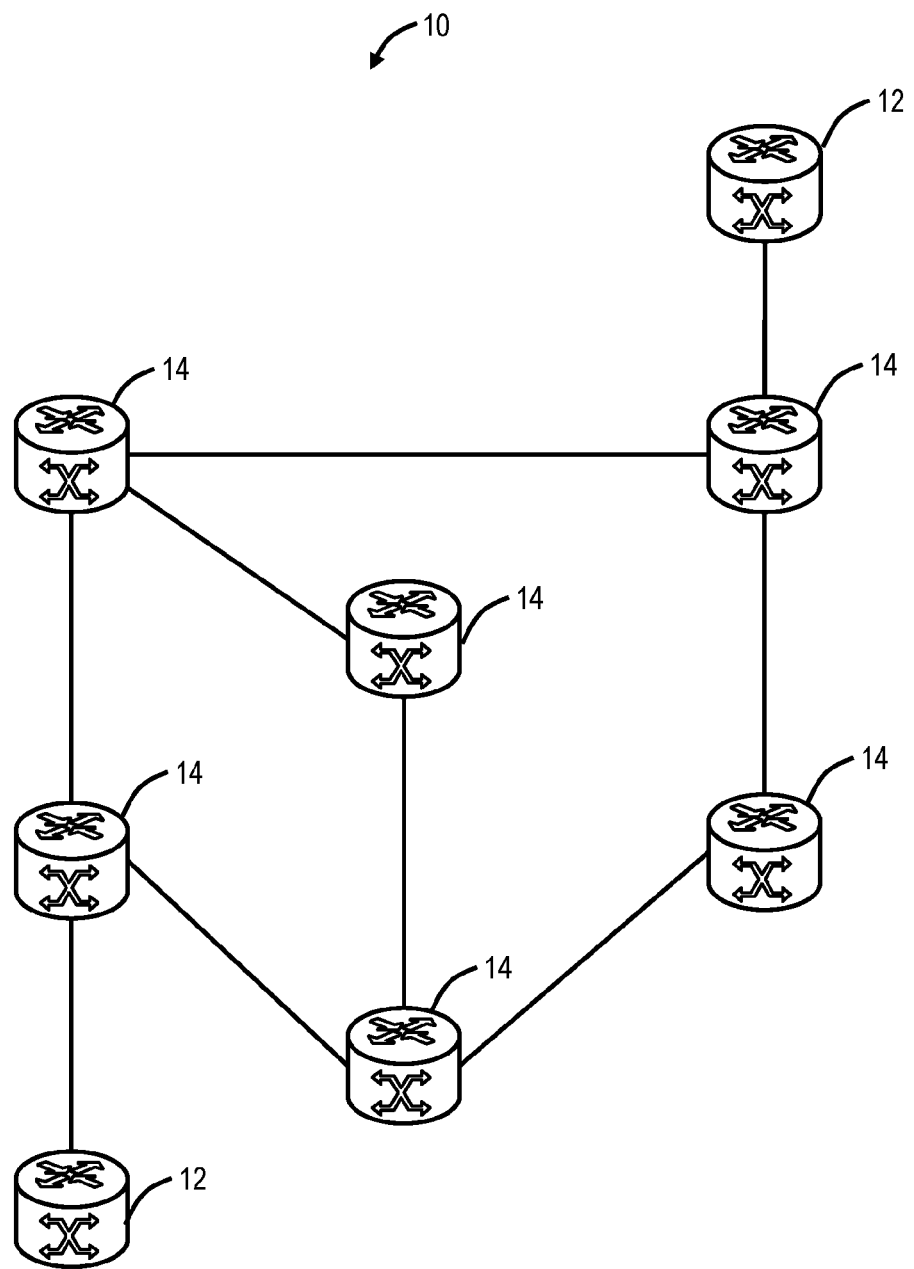
FIG. 1 is a network diagram illustrates an MPLS network with various interconnected network elements.

Referring to FIG. 1, in an exemplary embodiment, a network diagram illustrates an MPLS network 10 with various interconnected network elements 12, 14. The network elements 12 are Label Edge Routers (LER) which can also be referred to as Provider Edge (PE) nodes. The network elements 14 are Label Switch Routers (LSR) which can also be referred to as Provider (P) nodes. The MPLS network 10 is presented herein for illustration purposes and those of ordinary skill in the art will recognize other deployments can include additional network elements. Within the MPLS network 10, the LSRs 14 are configured to forward traffic along Label Switched Paths (LSPs) between the LERs 12. MPLS is used in the MPLS network 10 to reduce a number of address lookups performed at the various network elements 12, 14. For example, a packet can be received by the LER 12 which conventionally performs a lookup to determine which label should be pushed onto the packet to switch the packet onto an LSP to the next hop through the MPLS network 10 to reach its destination. When the packet arrives at the LSR 14, the LSR 14 will read the MPLS label and replace the MPLS label with a new MPLS label. MPLS thus allows a single route lookup to be performed at the edge of the MPLS network 10, and allows label switching to be used instead of address lookups to forward the packet across the MPLS network 10. Forwarding in an MPLS network 10 is performed by swapping a label after stripping the Media Access Control (MAC) header at each hop.

MPLS-TP or MPLS Transport Profile is a profile of MPLS whose definition has been standardized by the IETF. It is designed for use as a network layer technology in transport networks. MPLS-TP is a connection-oriented packet-switched (CO-PS) application. MPLS-TP offers a specialized MPLS implementation by removing features that are not relevant to CO-PS applications and adding mechanisms that provide support of critical transport functionality. MPLS-TP is based on the same architectural principles of layered networking that are used in longstanding transport network technologies like SDH, SONET and OTN. Service providers have already developed management processes and work procedures based on these principles. MPLS-TP makes available to service providers a reliable packet-based technology that is based upon circuit-based transport networking, and thus aligns with current organizational processes and large-scale work procedures similar to other packet transport technologies. MPLS-TP provides Quality of Service (QoS), end-to-end Operations, Administration, and Maintenance (OAM), and protection switching.

Header Space Analysis

Figure 2:
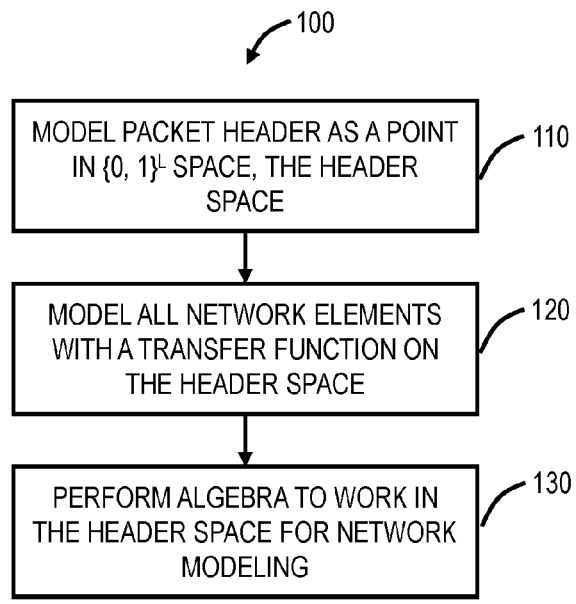
FIG. 2 is a flow chart of header space analysis.
Figure 3:
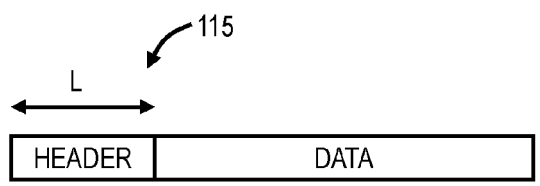
FIG. 3 is a logical representation of the header space analysis.
Figure 3:
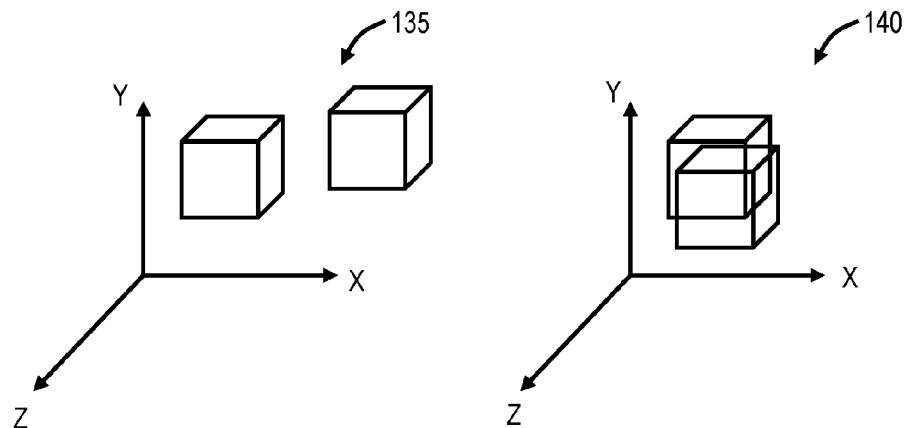

Referring to FIGS. 2 and 3, in an exemplary embodiment, a flow chart and logical representations illustrate header space analysis 100. The header space analysis 100 is a general, protocol-agnostic framework for reachability analysis, forwarding loops, traffic isolation, and leakage problems in networks. The header space analysis 100 contemplates operation on a processing system, such as a server. The flow chart in FIG. 2 illustrates the three general aspects of running the header space analysis. First, packet headers are modeled as a region in $\{0, 1\}^L$ space known as a header space (step 110). Fully specified packet headers are modeled as a point in this space, while incompletely specified packet headers are modeled as a volume in this L-dimensional space. A packet 115 is illustrated in FIG. 3, and L is a maximum length of the packet 115 header. Second, all network elements are modeled with a transfer function on the header space (step 120). Third, algebra is performed to work in the header space for network modeling (step 130).

The header space analysis 100 recognizes that network forwarding has become complex with the introduction of so many different protocols affecting the packet 115 header. The goal of the header space analysis 100 is to be protocol agnostic, treating each packet 115 solely as a region (e.g., point or volume) in the header space, and relying on the transfer function to perform the protocol specific aspects in the header space. The algebra in the header space analysis 100 can answer questions about the network such as "can the node A communicate to the node B?" or "can packets loop in the network?" or the like. Another aspect of the header space analysis 100 is slicing, which is partitioning the network. Through the header space analysis 100, one can determine if a node is prevented from communicating with another node. The header space analysis 100 uses a geometric approach to packet classification, instead of a protocol approach.

The header space analysis 100 models all functions in the network as box transfer functions transforming subspaces of the L-dimensional header space to other subspaces. Modeling how a packet flows in the network uses a network transfer function and a topology transfer function that combine all associated transfer functions into one giant function that models all the links connecting all the ports together. In FIG. 3, two graphs 135, 140 illustrate two header spaces. In the graph 135, the header spaces are disjoint, thereby showing no leakage. In the graph 140, the header spaces overlap, showing leakage.

The header space analysis 100 ignores all protocol-specific meanings in the packet 115 header and views the packet 115 header as a sequence of ones and zeros, i.e. a point or region in the $\{0, 1\}^L$ space where L is the upper bound on the header length. This is called a header space, H. Wildcard expressions are used to define objects in H. Each wildcard expression is a sequence of L bits where each bit can be either 0, 1 or x (where x signifies that the bit has the value "either", or "unknown"). Each wildcard expression corresponds to a hypercube in H. Every region, or flow, in H is defined as a union of wildcard expressions. H abstracts away the data portion of the packet because assuming it does not affect packet processing.

The header space analysis 100 models the network space, N, as a set of switches with external interfaces, or ports, each modeled as having a unique identifier. Taking the cross-product of the switch-port space (the space of all ports in the network, S) with H, can represent a packet traversing on a link as a point in $\{0, 1\}^L \times (1, \ldots, P)$ space, where $\{1, \ldots, P\}$ is the list of all ports in the network. The space of all possible packet headers, localized at all possible input ports in the network is the network space, N.

As a packet traverses the network, it is transformed from one point in Network Space to other point(s) in Network Space. For example, a layer 2 switch, that merely forwards a packet from one port to another, without rewriting headers, transforms packets only along the switch-port axis, S. On the other hand, an MPLS switch that rewrites some fields (e.g. MAC address, label, TTL, checksum) and then forwards the packet, transforms the packet both in H and S. As these examples suggest, all network elements can be modeled as transformers with a transfer function, which model their protocol dependent functions. More precisely, a node can be modeled using its transfer function, T, that maps header h arriving on port p: $T(h, p): (h, p) \rightarrow \{(h_1, p_1), (h_2, p_2), \ldots\}$. In general, an output of a transfer function is a set of (header, port) pairs to allow multicasting.

For the network transfer function, given that switch ports are numbered uniquely, all of the box transfer functions can be combined into a composite transfer function describing the overall behavior of the network. For example, a network of n network elements with transfer functions $T_1(\ ), \ldots, T_n(\ )$, then the network transfer function, $\Psi$ is:

$$\Psi(h, p) = \begin{cases} T_1(h, p) & \text{if } p \in switch_1 \\ T_n(h, p) & \text{if } p \in switch_n \end{cases}$$

Here, the network transfer function is shown for forwarding. More complex network transfer functions can be developed for different protocol behavior in the packet 115 header.

For the topology transfer function, $\Gamma$, it can be defined as:

$$\Gamma(h, p) = \begin{cases} \{(h, p^*)\} & \text{if } p \text{ connected to } p^* \\ \{\} & \text{if } p \text{ is not connected} \end{cases}$$

The topology transfer function, $\Gamma$, models the behavior of links in the network. It accepts a packet at one end of a link, and returns the same packet, unchanged, at the other end.

The header space analysis 100 can use algebra with algorithms that compute reachability or determine if two slices can interact must determine how different spaces overlap. The algebra uses a basic set of operations on H: intersection, union, complementation and difference, along with the Domain, Range and Range Inverse for transfer functions. These operations use existing techniques on bit vectors, as well as operations defined on wildcard expressions. Specifically, the headers are represented as points in H and wildcard expressions are hyper-cubes in H.

For intersection, for two headers to have a non-empty intersection, both headers must have the same bit value at every position that is not a wildcard. If two headers differ in bit $b_i$, then the two headers will be in different hyper-planes defined by $b_i=0$ and $b_i=1$. On the other hand, if one header has an x in a position while the other header has a 1 or 0, the intersection is non-empty. For union, in general, a union of wildcard expressions cannot be simplified. For example, no single header can represent the union of 1111xxxx and 0000xxxx. This is why a header space object is defined as a union of wildcard expressions. In some cases, the union can be simplified (e.g., 1100xxxx ∪ 1000xxxx simplifies to 1x00xxxx) by simplifying an equivalent Boolean expression. For complementation, the algorithm finds all non-intersecting headers by replacing each 0 or 1 in the header with its complement. For difference, the operation can be calculated, A−B, using intersection and complementation.

To capture the destiny of packets through a box or set of boxes, domain, range and range inverse can be defined. The domain of a transfer function is the set of all possible (header, port) pairs that the transfer function accepts. Even headers for which the output is empty (i.e., dropped packets) belong to the domain. The range of a transfer function is the set of all possible (header, port) pairs that the transfer function can output after applying all possible inputs on every port. For Range Inverse, Reachability and loop detection computation requires working backwards from a range to determine what input (header, port) pairs could have produced it. If $S=\{(h_1, p_1), \ldots, (h_j, p_2)\}$, then the range inverse of S under transfer function $T(\cdot)$ is $X=\{(h_1, p_1))\}|_1''$ such that $T(X)=S$. Equivalently, $X=T^1(S)$. The inverse of a transfer function is well defined: A transfer function maps each (h, p) pair to a set of other pairs. By following the mapping backward, the transfer function can be inverted.

With the algebra defined, the header space analysis 100 can perform reachability analysis, loop detection, slice isolation, and the like. For reachability analysis, one can trace all possible packet headers at a source to see if it reaches the destination. Using header space analysis, consider the space of all headers leaving the source, then track this space as it is transformed by each successive networking box along the path (or paths) to the destination. At the destination, if no header space remains, the two hosts cannot communicate. Otherwise, trace the remaining header spaces backwards (using the range inverse at each step) to find the set of headers the source can send to reach the destination. A loop occurs when a packet returns to a port it has visited earlier.

Header space analysis can determine all packet headers that loop.

Header Space Analysis for Transport Networks

Figure 4:
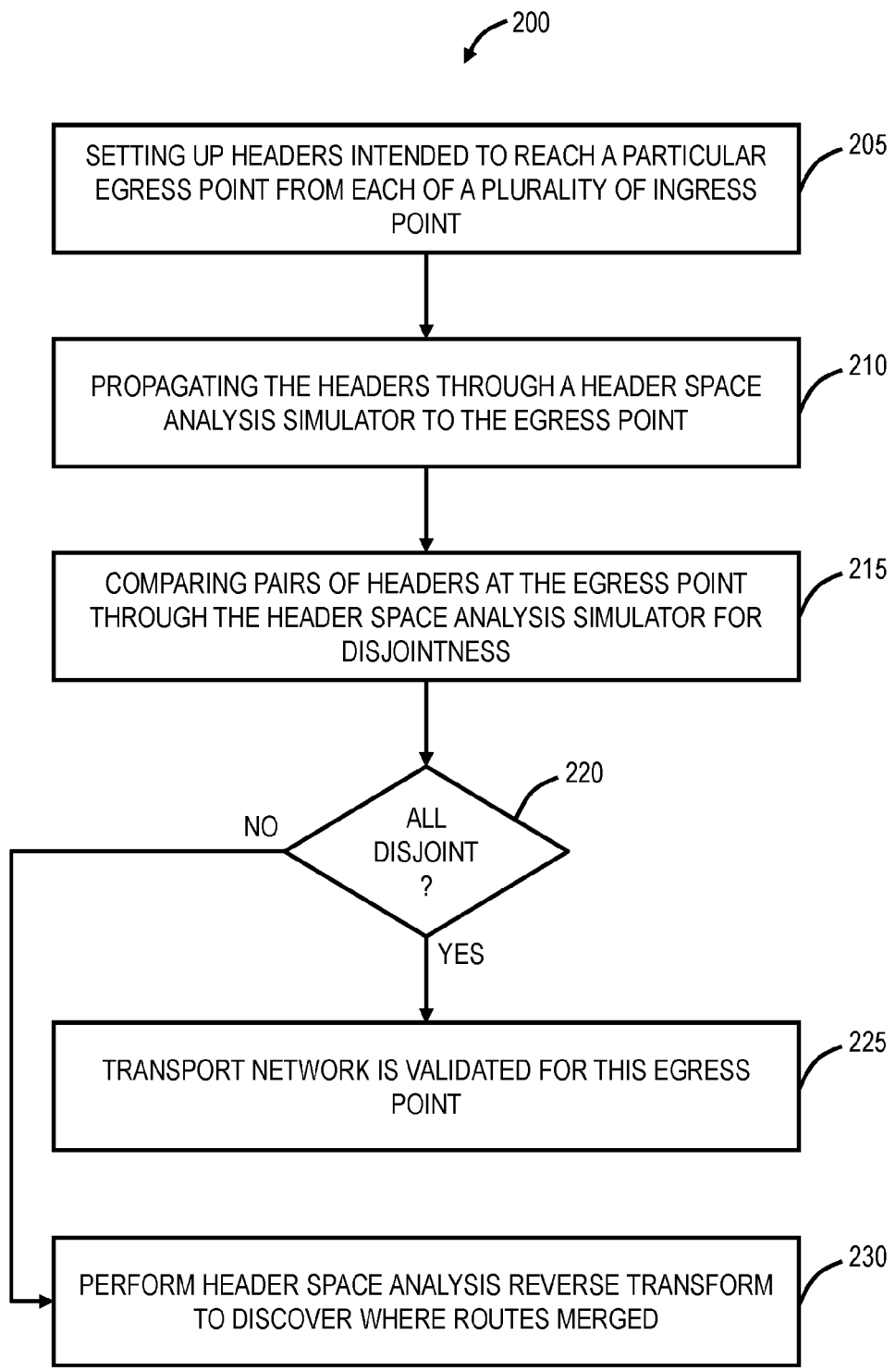
FIG. 4 is a flow chart of a header space analysis process for transport networks.

Referring to FIG. 4, in an exemplary embodiment, a flow chart illustrates a header space analysis process 200 for transport networks. The application of header space analysis to reachability analysis has previously been described. This is used to determine that a traffic from a source, or set of sources, can reach a destination, or group of destinations. In many networks (e.g. MPLS/LDP implementations) that is sufficient for correct operation of the network, and for scaling reasons paths from multiple sources to a specific destination are merged, so that traffic from multiple sources arrives at the destination with identical headers.

Packet Transport mechanisms and technologies (e.g. MPLS-TP) impose an additional constraint; the path from any source must arrive at the destination distinguished at the MPLS layer from every other source of traffic to that destination. This is necessary to support the correct operation of data-path OAM and other instrumentation. This means that two headers arriving at a same destination, with different sources, must be unique. Header space analysis has not been adapted to this additional constraint in Packet Transport technologies. This constraint can be verified by setting up the headers intended to reach a particular destination from each desired ingress, and propagating them through a header space analysis network simulator to the egress. There, pairs of headers may be compared or determined for "disjoint-ness" (distinguishability, i.e. a pair of headers that are identical are not disjoint). When the comparison has been performed, any aliases (non-disjoint headers from different sources) can be backtracked using the header space analysis reverse transform to discover where the routes merged.

With the header space analysis process 200, the MPLS-TP constraint can be verified by setting up the headers intended to reach a particular egress point from each desired ingress (step 205), and propagating them through an header space analysis network simulator to the egress point (step 210). There, pairs of headers may be compared for "disjoint-ness" (distinguishability), using the operation described in the header space analysis algebra in other contexts (step 215). In this MPLS-TP case, a pairwise comparison of all headers arriving at the destination is performed which includes checking every output header with every other output header. This may be performed more expeditiously if, whenever two headers differing in a only single bit are encountered in such a comparison, that header pair is consolidated with that bit set to "x" before being carried forward as a single header to the remaining tests. This consolidation may advantageously be performed recursively; if a consolidated header formed as described also differs from another header, so consolidated or not, in a single bit only, they may be in turn be consolidated into a single header with that bit set to "x". Here, the header space analysis process 200 includes consolidating header pairs differing in only a single bit into a single less-specific header at each stage of pairwise comparisons of all the output headers from the header space analysis process 200. When the comparison has been performed, if all headers are disjoint (step 220), then the transport network is validated for this particular egress point (step 225). Otherwise, any aliases (non-disjoint headers from different sources) can be backtracked using the header space analysis reverse transform to discover where the routes merged (step 230). That is, the steps 225, 230 can be used for determining validity of a point-to-point connection property (A-Z paths which are ingress to egress) of the packet transport network responsive to the disjointness of the output headers.

In another exemplary implementation, the header from every expected and distinguishable route from a source is propagated backwards, from the egress point, through the simulated network using the header space analysis reverse transform, whereupon the arrival of predecessor headers at multiple sources is an indication that paths could have merged. In a further exemplary embodiment, the header space analysis process 200 can include setting up wildcard headers from one or more ingress points, and simulating propagation of the wildcard headers to the particular egress point through the header space analysis. The determining disjointness can include performing pairwise comparisons of all the output headers from the header space analysis. Alternatively, the determining disjointness can include consolidating header pairs differing in only a single bit into a single less-specific header at each stage of pairwise comparisons of all the output headers from the header space analysis.

Thus, the header space analysis process 200 provides a specific application of header space analysis, and in particular the "all pairs" header comparison to MPLS-TP scenario, and the computational efficiencies thereof. The header space analysis process 200 allows near-real-time validation that packet transport flows in an MPLS-TP network have been correctly programmed on the switches by a Software Defined Networking (SDN) controller or other technique such that the correct label mappings have been made to carry a flow from a source to a destination, and all flows from any source to a destination are isolated from one another.

Exemplary Server

Figure 5:
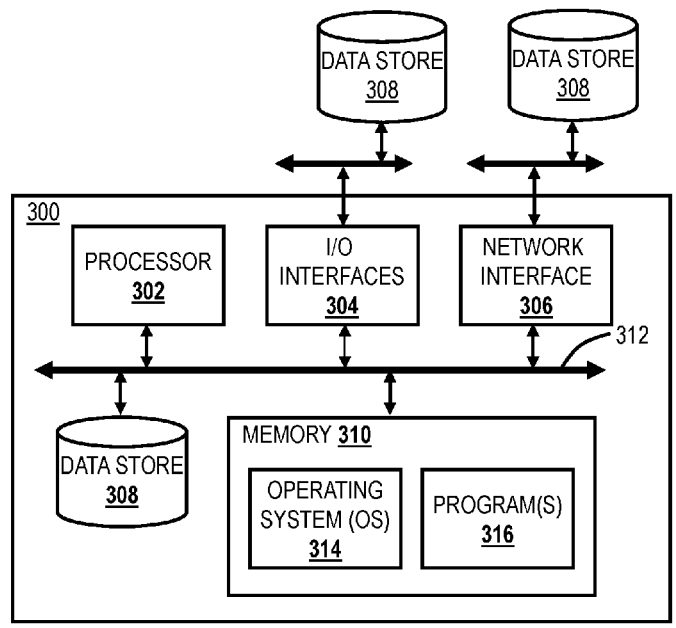
FIG. 5 is a block diagram of a server which can be used for a header space analysis network simulator to implement the header space analysis process of FIG. 4.

Referring to FIG. 5, in an exemplary embodiment, a block diagram illustrates a server 300 which can be used for a header space analysis network simulator to implement the header space analysis process 200. The server 300 can be a digital computer that, in terms of hardware architecture, generally includes a processor 302, input/output (I/O) interfaces 304, a network interface 306, a data store 308, and memory 310. It should be appreciated by those of ordinary skill in the art that FIG. 5 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 can include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 can be used to receive user input from and/or for providing system output to one or more devices or components. User input can be provided via, for example, a keyboard, touch pad, and/or a mouse. System output can be provided via a display device and a printer (not shown). I/O interfaces 304 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 306 can be used to enable the server 300 to communicate on the network 120. The network interface 306 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 can include address, control, and/or data connections to enable appropriate communications on the network. A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the server 300 such as, for example, an internal hard drive connected to the local interface 312 in the server 300. Additionally in another embodiment, the data store 308 can be located external to the server 300 such as, for example, an external hard drive connected to the I/O interfaces 304 (e.g., SCSI or USB connection). In a further embodiment, the data store 308 can be connected to the server 300 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 can incorporate electronic, magnetic, optical, and/or other types of storage media. Note that the memory 310 can have a distributed architecture, where various components are situated remotely from one another, but can be accessed by the processor 302. The computer-executed instructions in memory 310 can include one or more software programs, each of which includes an ordered listing of executable instructions for implementing logical functions. The computer-executed instructions in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

The server 300 can include computer-executed instructions that, when executed, cause the processor to implement steps of performing a header space analysis with a plurality of headers between ingress points and a particular egress point; determining disjointness of output headers from the header space analysis; and determining validity of a point-to-point connection property of the Packet Transport network responsive to the disjointness of the output headers. Optionally, the header space analysis can include setting up headers intended to reach the particular egress point from each of the ingress points; simulating propagation of the headers to the particular egress point through the header space analysis; and performing pairwise comparisons of all the output headers from the header space analysis. The determining disjointness can include consolidating header pairs differing in only a single bit into a single less-specific header at each stage of the pairwise comparisons. Alternatively, the header space analysis can include setting up wildcard headers from one or more ingress points; and simulating propagation of the wildcard headers to the particular egress point through the header space analysis. The determining disjointness can include performing pairwise comparisons of all the output headers from the header space analysis or consolidating header pairs differing in only a single bit into a single less-specific header at each stage of pairwise comparisons of all the output headers from the header space analysis.

Further, the header space analysis can include setting up a header at the particular egress point corresponding to a specific ingress point; simulating propagation of the header in reverse to each of the associated ingress points through the header space analysis; and testing that a transformed header is present at the specific ingress point and is not present at any other ingress point. Optionally, the Packet Transport network utilizes Multiprotocol Label Switching-Transport Profile (MPLS-TP). The server 300 can implement a tool associated with a management system of the Packet Transport network, or be part of the management system; other embodiments are also contemplated.

Exemplary Switch

Figure 6:
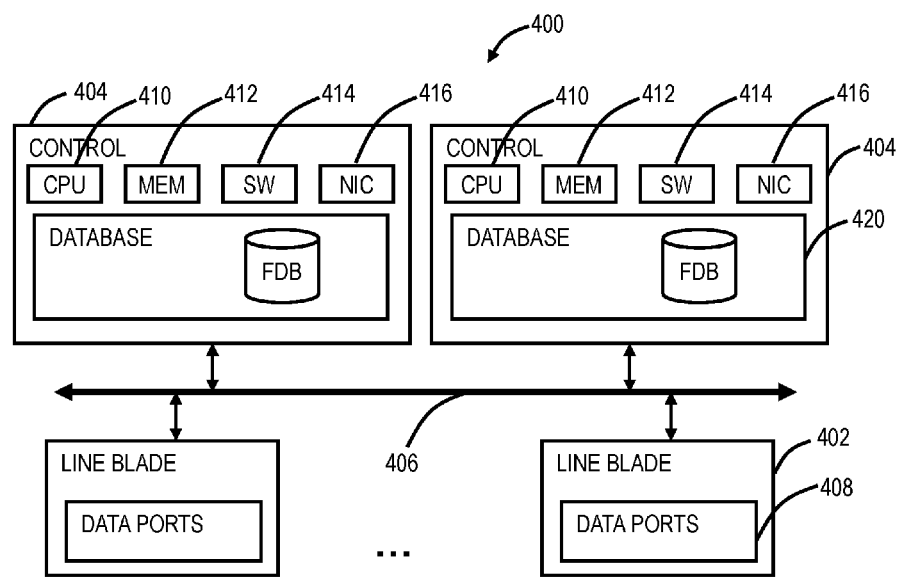
FIG. 6 is a block diagram of an exemplary implementation of a switch.

Referring to FIG. 6, in an exemplary embodiment, a block diagram illustrates an exemplary implementation of a switch 400, for use herein. In this exemplary embodiment, the switch 400 is a network switch, but those of ordinary skill in the art will recognize the systems and methods described herein contemplate other types of network elements and other implementations. The network elements 12, 14 can be implemented as the switch 400 for LSRs, LERs, etc. In this exemplary embodiment, the switch 400 includes a plurality of blades 402, 404 interconnected via an interface 406. The blades 402, 404 are also known as line cards, line modules, circuit packs, pluggable modules, etc. and refer generally to components mounted within a chassis, shelf, etc. of a data switching device, i.e., the switch 400. Each of the blades 402, 404 can include numerous electronic devices and optical devices mounted on a circuit board along with various interconnects including interfaces to the chassis, shelf, etc.

Two exemplary blades are illustrated with line blades 402 and control blades 404. The line blades 402 generally include data ports 408 such as a plurality of Ethernet ports. For example, the line blade 402 can include a plurality of physical ports disposed on an exterior of the blade 402 for receiving ingress/egress connections. Additionally, the line blades 402 can include switching components to form a switching fabric via the backplane 406 between all of the data ports 408 allowing data traffic to be switched between the data ports 408 on the various line blades 402. The switching fabric is a combination of hardware, software, firmware, etc. that moves data coming into the switch 400 out by the correct port to the next switch 400. "Switching fabric" includes switching units, or individual boxes, in a node; integrated circuits contained in the switching units; and programming that allows switching paths to be controlled. Note, the switching fabric can be distributed on the blades 402, 404, in a separate blade (not shown), or a combination thereof. The line blades 402 can include an Ethernet manager (i.e., a CPU) and a network processor (NP)/application specific integrated circuit (ASIC). As described herein, the line blades 402 can participate in the systems and methods described herein.

The control blades 404 include a microprocessor 410, memory 412, software 414, and a network interface 416. Specifically, the microprocessor 410, the memory 412, and the software 414 can collectively control, configure, provision, monitor, etc. the switch 400. The network interface 416 may be utilized to communicate with an element manager, a network management system, etc. Additionally, the control blades 404 can include a database 420 that tracks and maintains provisioning, configuration, operational data and the like. The database 420 can include a forwarding database (FDB). In this exemplary embodiment, the switch 400 includes two control blades 404 which may operate in a redundant or protected configuration such as 1:1, 1+1, etc. In general, the control blades 404 maintain dynamic system information including Layer two forwarding databases, protocol state machines, and the operational status of the ports within the switch 400.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for validation of a packet transport network, the method comprising:
   performing a header space analysis, with input headers to obtain output headers from the header space analysis, between one or more ingress points and a particular egress point, wherein the header space analysis comprises
      modeling the input headers as a region or point in a header space that is an L-dimensional space with L based on a size of the input headers,
      modeling network elements in the packet transport network each as transfer functions on the header space, and
      obtaining the output headers from the input headers based on the transfer functions, wherein the transfer functions in the header space are based on associated protocols such that the header space and associated representation of the input headers and the output headers is protocol agnostic;
   determining disjointness of the output headers; and
   determining validity of a point-to-point connection property of the packet transport network based on the disjointness of the output headers in the header space.

2. The method of claim 1, wherein the determining disjointness comprises:
   performing pairwise comparisons of all the output headers.

3. The method of claim 1, wherein the header space analysis comprises:
   setting up a header for each of the one or more ingress points intended to reach the particular egress point; and
   simulating propagation of the header for each of the one or more ingress points to the particular egress point to obtain the output headers.

4. The method of claim 3, wherein the determining disjointness comprises:
   consolidating header pairs of the output headers differing in only a single bit into a single less-specific header prior to another stage of pairwise comparisons.

5. The method of claim 1, wherein the header space analysis comprises:
   setting up wildcard headers from one or more ingress points; and
   simulating propagation of the wildcard headers to the particular egress point.

6. The method of claim 4, wherein the determining disjointness comprises:
   consolidating header pairs differing in only a single bit into a single less-specific header prior to another stage of pairwise comparisons of all the output headers.

7. The method of claim 1, wherein the header space analysis further comprises:
   setting up a header at the particular egress point corresponding to a specific ingress point;
   simulating, in the header space analysis, propagation of the header in reverse to each of the associated ingress points; and
   testing that a transformed header is present at the specific ingress point and is not present at any other ingress point.

8. The method of claim 1, wherein the packet transport network utilizes Multiprotocol Label Switching-Transport Profile (MPLS-TP).

9. The method of claim 1, wherein the method is performed in a tool associated with a management system of the packet transport network.

10. The method of claim 1, wherein, for the input headers and the output headers, fully specified headers in the associated protocols are modeled as a point in the header space and incompletely specified headers are modeled as a region in the header space.

11. A server configured for validation of a packet transport network, the server comprising:
- a processor; and
- memory storing instructions that, when executed, cause the processor to
- perform a header space analysis, with input headers to obtain output headers from the header space analysis, between one or more ingress points and a particular egress point, wherein the header space analysis comprises
  - modeling the input headers as a region or point in a header space that is an L-dimensional space with L based on a size of the input headers,
  - modeling network elements in the packet transport network each as transfer functions on the header space, and
  - obtaining the output headers from the input headers based on the transfer functions, wherein the transfer functions in the header space are based on associated protocols such that the header space and associated representation of the input headers and the output headers is protocol agnostic;
- determine disjointness of the output headers, and
- determine validity of a point-to-point connection property of the packet transport network based on the disjointness of the output headers in the header space.

12. The server of claim 11, wherein, for the header space analysis, the memory storing the instructions that, when executed, further cause the processor to:
- set up a header for each of the one or more ingress points intended to reach the particular egress point; and
- simulate propagation of the header for each of the one or more ingress points to the particular egress point to obtain the output headers.

13. The server of claim 12, wherein, to determine disjointness, the memory storing the instructions that, when executed, further cause the processor to:
- consolidate header pairs of the output headers differing in only a single bit into a single less-specific header prior to another stage of pairwise comparisons.

14. The server of claim 11, wherein, for the header space analysis, the memory storing the instructions that, when executed, further cause the processor to:
- set up wildcard headers from one or more ingress points; and
- simulate propagation of the wildcard headers to the particular egress point.

15. The server of claim 14, wherein, to determine disjointness, the memory storing the instructions that, when executed, further cause the processor to:
- perform pairwise comparisons of all the output headers.

16. The server of claim 14, wherein, to determine disjointness, the memory storing the instructions that, when executed, further cause the processor to:
- consolidate header pairs differing in only a single bit into a single less-specific header prior to another stage of pairwise comparisons of all the output headers.

17. The server of claim 11, wherein, for the header space analysis, the memory storing the instructions that, when executed, further cause the processor to:
- set up a header at the particular egress point corresponding to a specific ingress point; simulate, in the header space analysis, propagation of the header in reverse to each of the associated ingress points; and
- test that a transformed header is present at the specific ingress point and is not present at any other ingress point.

18. The server of claim 11, wherein the packet transport network utilizes Multiprotocol Label Switching-Transport Profile (MPLS-TP).

19. A packet transport network, comprising:
- a plurality of interconnected network elements performing packet forwarding using a transport paradigm which uniquely identify an A-Z path of every packet in the network without merging headers at intermediate network elements; and
- a server configured to
- perform a header space analysis, with input headers to obtain output headers from the header space analysis, between one or more ingress points and a particular egress point, each of the ingress points and the particular egress point being a different network element of the plurality of interconnected network elements, wherein the header space analysis comprises
  - modeling the input headers as a region or point in a header space that is an L-dimensional space with L based on a size of the input headers,
  - modeling network elements in the packet transport network each as transfer functions on the header space, and
  - obtaining the output headers from the input headers based on the transfer functions, wherein the transfer functions in the header space are based on associated protocols such that the header space and associated representation of the input headers and the output headers is protocol agnostic;
- determine disjointness of the output headers, and
- determine validity of a point-to-point connection property of the packet transport network based on the disjointness of the output headers in the header space.

20. The packet transport network of claim 19, wherein the packet transport network utilizes Multiprotocol Label Switching-Transport Profile (MPLS-TP).

* * * * *